United States Patent Office 3,842,044
Patented Oct. 15, 1974

3,842,044
PROCESS FOR PRODUCING SULTONE- OR HYDROXYALKANESULFONATE-MODIFIED POLYAMIDES
James W. Cleary, Bartlesville, Okla., assignor to Phillips Petroleum Company
No Drawing. Filed Sept. 18, 1972, Ser. No. 290,262
Int. Cl. C08g 20/20, 20/38
U.S. Cl. 260—78 R  3 Claims

ABSTRACT OF THE DISCLOSURE

A hydroxy sulfonic acid or alkali metal salt thereof or an alkanesultone is incorporated in the polymerization recipe to produce a polyamide having an improved dyeability with basic dyes.

This invention relates to sultone- or hydroxyalkanesulfonate-modified polyamides.

In one of its more specific aspects, this invention relates to a method of imparting improved basic dyeability to polyamides.

The production and uses of polyamides such as nylon 6–6 and copolymers of bis(4-aminocyclohexyl)methane and dodecanedioic acid are well known. Because such polyamides are widely used in fiber form for the production of fabrics, it is important that they be dyeable, e.g., with basic dyes, but resistant to staining, e.g., with acid dyes. While such materials generally possess a certain susceptibility to dyeing, there has now been discovered a method of enhancing the basic dyeability of such materials. This invention pertains to that method and to those basic dyeable materials.

According to this invention there is provided a method of imparting basic dye receptivity to polyamides which comprises incorporating into the polyamide at least one of a hydroxy sulfonic acid, an alkali metal salt thereof, or an alkanesultone, the sultone optionally with an alkali metal hydroxide, in an amount sufficient to improve the basic dyeability of the polyamide. Either or any one of the above modifiers is incorporated in any effective amount, from about 0.05 to about 5 mole percent, based on the moles of recurring units in the polyamide product, usually being sufficient.

The above-mentioned modifiers can be employed in the preparation of any of the polyamides comprising the reaction product obtained from at least one material selected from the group consisting of amino acids, lactams, dicarboxylic acids, diamines, and salts of dicarboxylic acids and diamines. Typical dicarboxylic acids include succinic acid, adipic acid, pimelic acid, suberic acid, azelaic acid, sebacic acid, dodecanedioic acid and the like, and mixtures thereof. Typical diamines which can be used include ethylenediamine, hexamethylenediamine, decamethylenediamine, dodecamethylenediamine, 1,4 - cyclohexanediamine, 1,4 - bis(aminomethyl)cyclohexane, 1,4-bis(2-aminoethyl) cyclohexane, bis(4 - aminocyclohexyl)methane, and the like, and their mixtures. The diamine can be employed as a salt of the dicarboxylic acid such as nylon 6–6 salt from hexamethylenediamine and adipic acid.

Typical amino acids which can be used include 3-aminopropionic acid, 6-aminocaproic acid, 4-ethyl - 6 - aminohexanoic acid, 9-aminononanoic acid, and the like, and mixtures thereof. Similarly, lactams such as epsilon-caprolactam can be employed. Such compounds as can be used in the preparation of the polyamides and the unmodified polyamides, themselves, are well known in the art.

Suitable hydroxy sulfonic acids and alkali metal salts thereof can be represented by the formula

HORSO₃M, wherein M is hydrogen or an alkali metal and R is a divalent saturated hydrocarbon radical having 1 to 20 carbon atoms, and preferably 2–6 carbon atoms.

Suitable alkanesultones can be represented by the formula

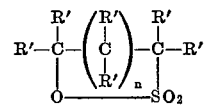

where $n$ is an integer of 0–10 and preferably 0–4, and R' is hydrogen or an alkyl radical having 1–4 carbon atoms, the total number of carbon atoms in each molecule of the alkanesultone being from about 2 to about 20, and preferably about 2 to about 6. The invention can employ with the alkanesultone an alkali metal hydroxide in an amount up to about 5 moles of the alkali metal hydroxide per mole of alkanesultone, preferably 0.1 to 2.5 moles of alkali metal hydroxide per mole of alkanesultone.

In the production of the polyamides of this invention, the polyamide-forming monomer or monomers are polymerized in contact with at least one of the above-defined hydroxy sulfonic acids or alkali metal salts thereof or alkanesultones, the hydroxy sulfonic acid or alkali metal salts thereof or alkanesultone being present in an amount within the range of about 0.05 to about 5 mole percent and preferably about 0.5 to about 4 mole percent, based on the moles of recurring units in the polyamide product.

A particularly suitable hydroxy sulfonic acid is sodium isethionate (sodium 2-hydroxyethanesulfonate); a suitable sultone is 1,3-propanesultone, the latter being advantageously employed with sodium hydroxide in an amount of about 1 to about 2 moles of sodium hydroxide per mole of 1,3-propanesultone. All these materials are commercially available.

The above-mentioned modifiers can be incorporated in the polyamides in any suitable manner. Preferably, they will be incorporated by introducing the modifier, in that concentration in which it is desired in the ultimate product, into the polymerization reaction, and conducting the reaction under the usual polymerization conditions to produce the polyamide having the modifier incorporated therein. The polyamide can be subsequently processed in the usual manner.

The best mode of practicing this invention is indicated in the following examples.

EXAMPLE I

A nylon 6–6 modified with 1,3-propanesultone at the 3 mole percent level and sodium hydroxide was prepared from a reaction mixture comprising 2 moles of nylon 6–6 salt solution, 0.060 mole of 1,3 - propanesultone, 0.080 equivalent of sodium hydroxide, and 0.020 mole adipic acid. The mixture was maintained at a temperature ranging upwards from 400° F. to 535° F. over a period of about 3 hours at a maximum pressure of about 300 p.s.i.g. The polymer recovered had an inherent viscosity of 0.90, as measured at 30° C. in a m-cresol solution having a polymer concentration of 0.5 g./100 ml. solution. The polymer was spun into fiber for evaluation of dyeability with a basic dye.

EXAMPLE II

A nylon 6–6, having incorporated therein sodium 2-hydroxyethanesulfonate as a modifier at the 2 mole percent level, was prepared from a mixture comprising 2 moles of nylon 6–6 salt solution 0.040 mole sodium 2-hydroxyethanesulfonate, and 0.020 mole of adipic acid. The mixture was subjected to reaction conditions substantially equivalent to those of Example I, and the polymer recovered had an inherent viscosity of 1.01 in m-cresol, determined as in Example I. The polymer was spun into fiber for determination of basic dyeability.

The polyamide fibers produced by the above procedures weme evaluated as to dyeability by dyeing with Sevron Blue 2G, a basic dye, in the amount of 2 OWF percent. An adipic acid-capped nylon to which no modifier had been added was dyed under substantially identical conditions.

Results were as follows:

| Polymer: | K/S value [1] |
|---|---|
| Unmodified Polyamide | 6.73 |
| Polymer of Example I | 13.30 |
| Polymer of Example II | 13.14 |

[1] See U.S. 3,184,434.

These data indicate that the method of this invention produces a modified polyamide having improved basic dye receptivity.

It will be evident from the foregoing that various modifications can be made to the method of this invention. Such are considered, however, to be within the scope of the invention.

What is claimed is:

1. In producing a fiber forming polyamide consisting essentially of the fiber forming aliphatic polycarbonamide product of a dicarboxylic acid and a diamine, or a salt of a dicarboxylic acid and a diamine, a method for improving the dyeability of the resultant polymer comprising incorporating into said polyamide from about 0.05 to about 5 mole percent 1,3-propanesultone.

2. The method of claim 1 in which said polycarbonamide product is the salt of adipic acid and hexamethylene diamine.

3. The method of claim 2 in which said 1,3-propanesultone is incorporated in said polyamide with sodium hydroxide.

References Cited

UNITED STATES PATENTS

| 2,989,364 | 6/1961 | Goldann | 260—785 C |
| 3,539,353 | 11/1970 | Gates et al. | 260—117 |
| 3,637,900 | 1/1972 | Kimura et al. | 260—830 P |

FOREIGN PATENTS

| 1,062,930 | 1/1960 | Germany. |

OTHER REFERENCES

Noller—Chemistry of Organic Compounds, 1957, pp. 293–295.

HAROLD D. ANDERSON, Primary Examiner

U.S. Cl. X.R.

8—178 R; 260—78 A, 78 L, 78 SC